(12) United States Patent
Banzhaf et al.

(10) Patent No.: US 11,242,835 B2
(45) Date of Patent: Feb. 8, 2022

(54) METHOD FOR OPERATING A WORK APPARATUS HAVING A COMBUSTION ENGINE

(71) Applicant: Andreas Stihl AG & Co. KG, Waiblingen (DE)

(72) Inventors: Jan-Philipp Banzhaf, Schwaikheim (DE); Karsten Schmidt, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 341 days.

(21) Appl. No.: 15/261,374

(22) Filed: Sep. 9, 2016

(65) Prior Publication Data

US 2017/0074227 A1    Mar. 16, 2017

(30) Foreign Application Priority Data

Sep. 15, 2015    (DE) .................. 10 2015 012 042.5

(51) Int. Cl.
| | | |
|---|---|---|
| *F02P 5/145* | (2006.01) | |
| *B27B 17/08* | (2006.01) | |
| *F02B 63/02* | (2006.01) | |
| *F02P 5/15* | (2006.01) | |

(52) U.S. Cl.
CPC ............ *F02P 5/145* (2013.01); *B27B 17/083* (2013.01); *F02B 63/02* (2013.01); *F02P 5/1504* (2013.01); *Y02T 10/40* (2013.01)

(58) Field of Classification Search
CPC ....... F02P 5/145; F02P 5/1504; B27B 17/083; Y02T 10/46; F02B 63/02
See application file for complete search history.

(56) References Cited

U.S. PATENT DOCUMENTS

| | | | | |
|---|---|---|---|---|
| 4,582,032 | A  * | 4/1986 | Hara ...................... | F02P 5/1508 123/339.11 |
| 5,447,131 | A | 9/1995 | Nickel et al. | |
| 5,992,380 | A  * | 11/1999 | Inagaki ................. | F02P 5/1502 123/339.11 |
| 6,223,723 | B1 * | 5/2001 | Ito ......................... | F02P 5/1504 123/406.51 |

(Continued)

FOREIGN PATENT DOCUMENTS

DE                3326278 A1    1/1985

*Primary Examiner* — Logan M Kraft
*Assistant Examiner* — Joshua Campbell
(74) *Attorney, Agent, or Firm* — Walter Ottesen, P.A.

(57) ABSTRACT

The invention relates to a method for operating a work apparatus having a combustion engine. An ignition device is provided for triggering an ignition spark at a spark plug for igniting a fuel/air mixture in a combustion chamber of the combustion engine. The combustion chamber is bounded by a piston which drives a crankshaft in a rotating manner. In order to avoid the combustion engine stopping in rich mode, the speed (n) of the combustion engine is monitored over the period of time (t, $\Delta T$) and the ignition point (ZZP) of the ignition device is advanced if the speed (n) of the combustion engine lies within a predefined speed range ($n_{min}$; $n_{max}$) within a predefined period of time (t, $\Delta T$) and then the speed n drops below a speed limit value ($n_G$).

21 Claims, 3 Drawing Sheets

(56) References Cited

U.S. PATENT DOCUMENTS

| | | |
|---|---|---|
| 7,493,889 B2 | 2/2009 | Nickel et al. |
| 8,544,448 B2 | 10/2013 | Ostojic et al. |
| 2002/0100438 A1* | 8/2002 | Raffenberg ............. F02B 33/04 |
| | | 123/73 A |
| 2003/0015175 A1* | 1/2003 | Andersson .......... F02D 35/0061 |
| | | 123/406.47 |
| 2009/0012699 A1* | 1/2009 | Bahner ............... F02D 41/2422 |
| | | 701/105 |
| 2011/0000462 A1* | 1/2011 | Ostojic .................. F02D 37/02 |
| | | 123/406.23 |
| 2012/0297631 A1* | 11/2012 | Kunert ................. F02P 5/1504 |
| | | 30/381 |
| 2013/0199812 A1* | 8/2013 | Dangelmaier .......... F02D 31/00 |
| | | 173/179 |
| 2014/0165964 A1* | 6/2014 | Leufen ................. F02P 5/1502 |
| | | 123/406.19 |
| 2014/0230787 A1* | 8/2014 | Mezaki ................ B27B 17/083 |
| | | 123/406.52 |
| 2015/0174751 A1 | 6/2015 | Gorenflo et al. |

\* cited by examiner

METHOD FOR OPERATING A WORK APPARATUS HAVING A COMBUSTION ENGINE

CROSS REFERENCE TO RELATED APPLICATIONS

This application claims priority of German patent application no. 10 2015 012 042.5, filed Sep. 15, 2015, the entire content of which is incorporated herein by reference.

BACKGROUND OF THE INVENTION

Known work apparatuses, such as chainsaws, brushcutters, cut-off grinders, blowers or the like, can be driven with a combustion engine which is frequently configured as a two-stroke engine or four-stroke engine. For the operation of the combustion engine, an ignition device is provided for triggering an ignition spark at a spark plug, wherein the ignition spark ignites a fuel/air mixture in the combustion chamber of the combustion engine. The piston bounding the combustion chamber is accelerated downward by the combustion pressure and drives a crankshaft in a rotating manner, wherein the piston executes a stroke between an upper dead center and a lower dead center.

The ignition device triggers the ignition spark at the spark plug at an ignition point dependent on the rotational position of the crankshaft, in order to ensure running of the engine as a function of the operating situation.

The rotating crankshaft of the combustion engine drives a tool via a clutch, wherein the clutch is expediently configured as a centrifugal clutch.

If a blockage of the tool occurs during the operation of the work apparatus, for example in the case of a chainsaw, a cut-off grinder or the like, the machine continues to suck up quantities of fuel, as under full load, since the user continues to open the throttle completely. This leads to a rich mixture as the speed becomes lower. If the user suddenly releases the throttle lever, this may lead to the combustion engine stopping.

A similar situation occurs if the user puts the combustion engine of the work apparatus into service despite a safety brake being engaged. If the user notices this and suddenly releases the throttle lever, the machine frequently stops in rich mode.

The fuel/air mixture supplied to the combustion engine under full load is ignited, with the full load speed being taken into consideration, at a predefined ignition point before the upper dead center and burns in such a manner that sufficient pressure is built up to drive the piston. However, at a late ignition point, an ignited rich fuel/air mixture sucked up under full load does not have sufficient time for complete combustion or for forming the flame front and an associated buildup of pressure, which is necessary for driving the piston. This may lead to the combustion engine stopping "in rich mode".

SUMMARY OF THE INVENTION

It is an object of the invention to provide a method for operating a work apparatus having a combustion engine, in which rich stopping of the combustion engine is avoided even under unfavorable operating conditions.

The rotational speed of the combustion engine is monitored, advantageously permanently monitored. In this way, it can be determined whether the rotational speed of the combustion engine is within a predefined rotational speed range within a predefined period of time.

If it is determined—for example via a rotational speed monitoring circuit—that the rotational speed is within a predefined rotational speed range for a predefined period of time and then the rotational speed of the combustion engine drops below a rotational speed limit value, the ignition point set by the ignition device is adjusted toward early.

As a result of the significant adjustment of the ignition point toward early, it is avoided that the rich fuel/air mixture is already heavily compressed at the ignition point and is ignitable only with difficulty. The adjustment of the ignition toward "early" ensures that the ignition spark takes place at a point at which the rich fuel/air mixture is still ignitable, that is, a combustion is initiated and the flame front can spread out. The effect achieved by this is that, for example, in the event of a blocked tool and dropping of the rotational speed into the predefined rotational speed range, an abrupt release of the throttle lever—and an associated sudden drop of the rotational speed of the combustion engine below a rotational speed limit value—does not lead to the combustion engine stopping in rich mode.

The conditions of the position of the rotational speed within a predefined rotational speed range and of a subsequent significant rotational speed drop below a rotational speed limit value can be linked with each other in a simple manner by a status indicator being set when the first condition is fulfilled and the ignition time then being adjusted to early if the drop of the rotational speed below the rotational speed limit value is determined at the set status indicator.

A status indicator once set is kept until the rotational speed drops below the rotational speed limit value and the ignition is adjusted toward early. A set status indicator can also be kept until the rotational speed rises again and lies above the predefined rotational speed range or exceeds the upper limit of the rotational speed range.

It may be expedient to keep the status indicator for a predetermined period of time. A time span of 2 to 3 seconds may be advantageous as the period of time.

The predefined period of time within which the rotational speed is intended to be within a predefined rotational speed range, and/or the period of time for which a set status indicator is kept, can advantageously be determined by a predefined number of crankshaft revolutions. The period of time is determined in a simple manner by five to fifty consecutive crankshaft revolutions; in particular, the period of time is specified by ten crankshaft revolutions. The determination of the period of time by crankshaft revolutions has the advantage that the time is matched to the current rotational speed of the combustion engine without special measures being required for this purpose.

The crankshaft revolutions which determine the period of time expediently directly follow one another.

The rotational speed limit value, below which the rotational speed should fall once the first condition is present, lies below the predefined rotational speed range. The rotational speed limit value is lower than the lower rotational speed limit of the rotational speed range.

The clutch which is provided between the crankshaft and the tool is expediently a centrifugal clutch. The engagement rotational speed of the centrifugal clutch lies below the designated rotational speed range.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
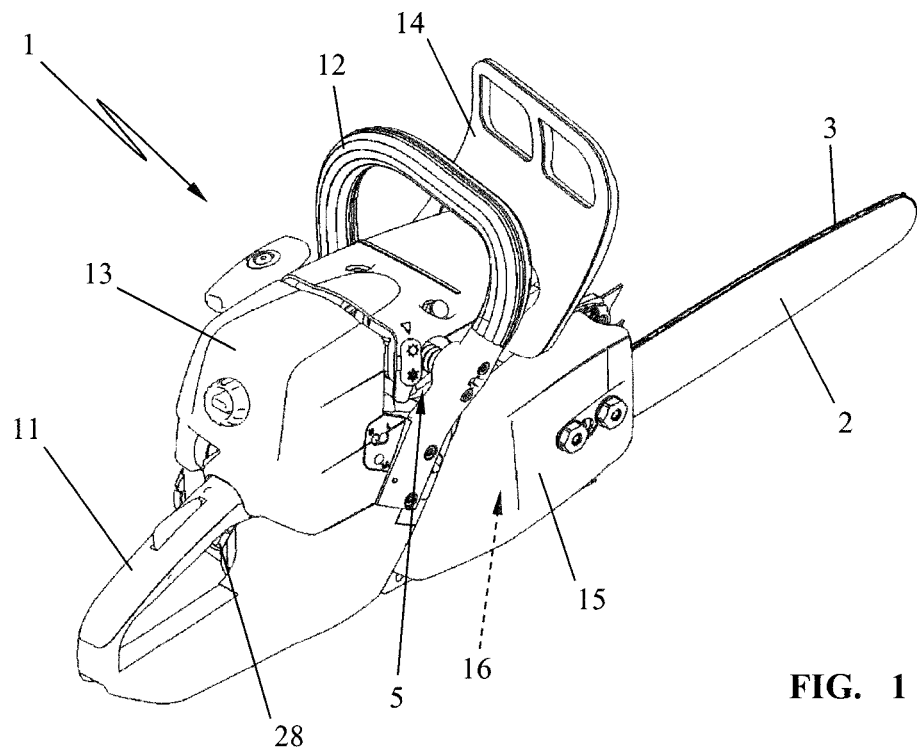
FIG. 1 is a perspective view of a work apparatus having a combustion engine, using the example of a chainsaw.

FIG. 1 shows a chainsaw as an example of a work apparatus 1 having a combustion engine, the saw chain 3 of which chainsaw, the saw chain revolving on a guide rail 2, being driven by the combustion engine 5. The work apparatus has a rear handle 11 which substantially extends in the longitudinal direction of the work apparatus 1. A throttle lever 28 for controlling the combustion engine 5 is provided in the rear handle 11. A front handle 12 is configured as a bale handle and engages over the housing 13 of the work apparatus 1 from the one longitudinal side to the other longitudinal side thereof. A hand guard 14 is provided in front of the front handle 12, the hand guard being provided as a trigger for a safety brake 16 located under a sprocket cover 15.

Figure 2:
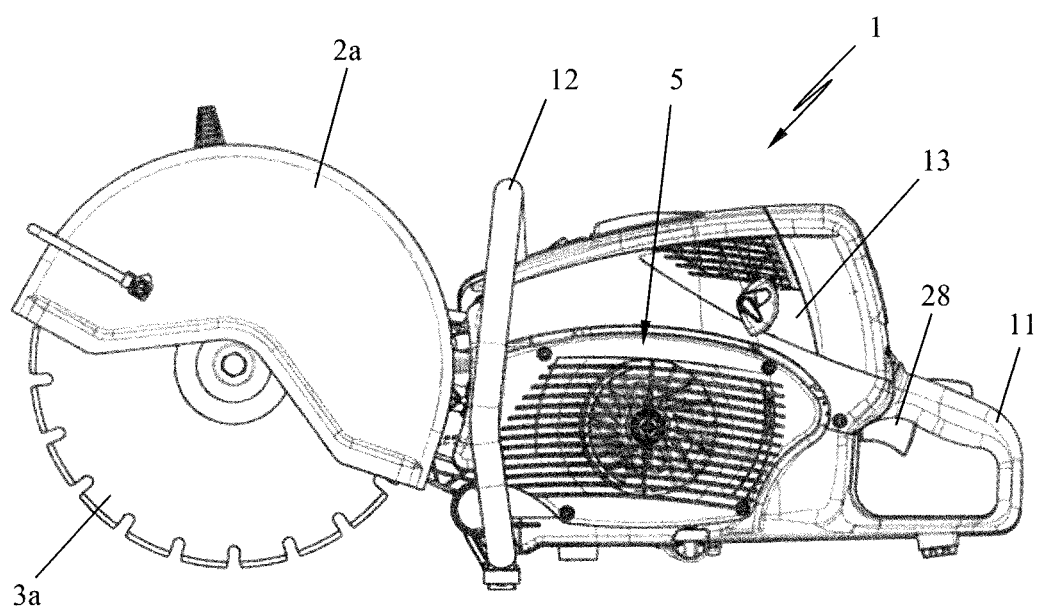
FIG. 2 is a perspective view of a work apparatus having a combustion engine, using the example of a cut-off grinder.

FIG. 2 shows a cut-off grinder as a further example of a work apparatus 1 having a combustion engine, the cutting disk 3a of which cut-off grinder is driven by the combustion engine 5. The cutting disk 3a is assigned a hood 2a which engages over the cutting disk 3a to provide protection and extends over a circumferential angle of 180°. The work apparatus 1 configured as a cut-off grinder has a rear handle 11 which substantially extends in the longitudinal direction of the work apparatus 1. A throttle lever 28 for controlling the combustion engine 5 is provided in the rear handle 11. A front handle 12 is configured as a bale handle and engages over the housing 13 of the work apparatus 1 from the one longitudinal side to the other longitudinal side thereof.

Figure 3:
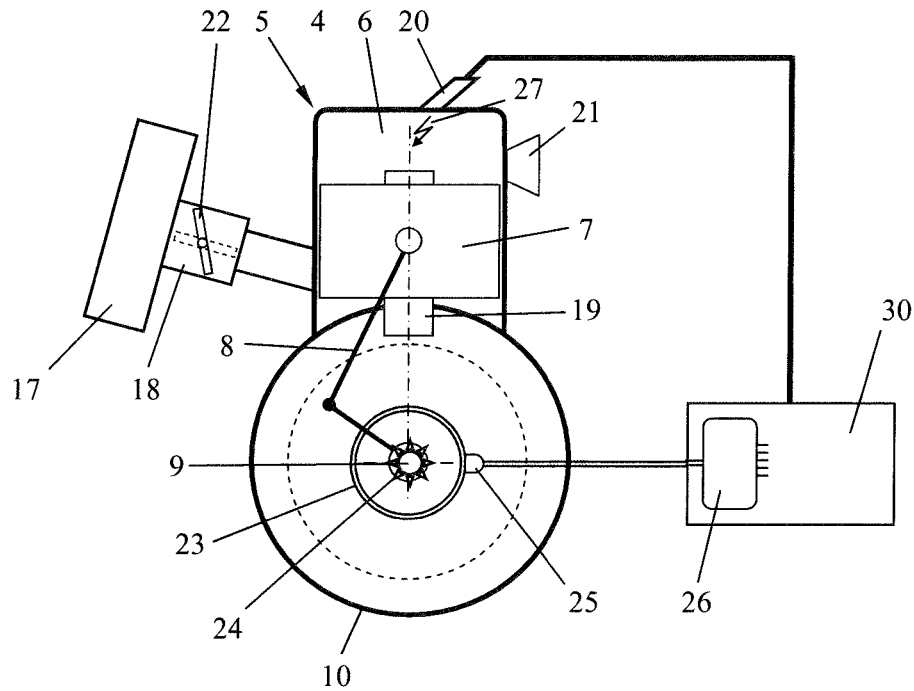
FIG. 3 is a schematic of a device for controlling the ignition point for ignition of the combustion engine.

The combustion engine 5 arranged in the housing of the work apparatus 1 is reproduced in a schematic illustration in FIG. 3 and includes a cylinder 4 with a combustion chamber 6 which is bounded by a piston 7. The piston 7 drives a crankshaft 9, which is mounted in a crankcase 10, via a connecting rod 8.

The combustion engine 5 draws in ignitable fuel/air mixture into the crankcase 10 via an air filter 17 and a mixture-forming device, which is illustrated by way of example and is a carburetor 18 in the embodiment. The mixture-forming device may also be an electronically controlled carburetor, or may include a fuel injection pump. During a downward movement of the piston 7, the ignitable fuel/air mixture formed in the mixture-forming device is conveyed from the crankcase 10 via at least one transfer channel 19 into the combustion chamber 6. During a following upward movement of the piston 7, the mixture in the combustion chamber 6 is compressed and is ignited by a spark plug 20. The combustion pressure building up during the combustion drives the piston 7 downward again, with the combustion gases being discharged via an outlet 21.

The mixture-forming device, the carburetor 18 in the embodiment, has a throttle valve 22, the rotational position of which can be controlled via the throttle lever 28 (FIGS. 1, 2) in the rear handle 11 of the work apparatus 1.

The spark plug 20 is activated by an ignition device 30 which triggers an ignition spark 27 at the spark plug 20 depending on the rotational position of the crankshaft 9 at an ignition point ZZP.

The rotating crankshaft 9 drives the tool, in the embodiment the saw chain 3 of the chainsaw according to FIG. 1, via a clutch 23. To this end, the clutch 23 drives a sprocket 24 via which the saw chain 3 is driven.

If the combustion engine runs under full load, for which purpose the throttle valve 22 is completely open (dashed line), a rich fuel/air mixture is supplied to the combustion chamber 6. If, for example, the hand guard 14, which acts as a trigger, of the safety brake 16 is then triggered, the output side of the clutch 23, which is configured as a centrifugal clutch, is braked. The rotational speed of the combustion engine drops; the combustion engine operates contrary to the applied safety brake 16.

A comparable situation arises if the tool which is driven by the combustion engine via the centrifugal clutch blocks. For example, the saw chain 3 or the cutting disk 3a may become wedged in the cut.

According to the invention, it is provided that the rotational speed (n) of the combustion engine 5 is monitored, in particular is permanently monitored. For this purpose, a rotational speed sensor 25 is arranged on the crankshaft, the output signal of which rotational speed sensor is supplied to a rotational speed monitoring circuit 26. The rotational speed monitoring circuit 26 is preferably integrated into the ignition device 30 in order to set the ignition point ZZP; the rotational speed monitoring circuit 26 is electrically connected to the ignition device 30.

During the operation of the combustion engine 5, the rotational speed sensor 25 indicates the current rotational speed (n) of the rotational speed monitoring circuit 26. The latter processes the signal in accordance with the sequence diagram in FIG. 4. First of all, it is monitored in a first element 50 whether the rotational speed (n) is within a rotational speed range which is determined by the minimum rotational speed $n_{min}$ and the maximum rotational speed $n_{max}$. The engagement rotational speed $n_{engage}$ of the clutch 23 configured as a centrifugal clutch lies outside this rotational speed range $n_{min} < n < n_{max}$. The engagement rotational speed $n_{engage}$ can be, for example, around approximately 3500 revolutions per minute. The minimum rotational speed $n_{min}$ can advantageously be around approximately 3700 revolutions and the maximum rotational speed $n_{max}$ around approximately 5000 revolutions. The rotational speed range determined by the minimum rotational speed $n_{min}$ and the maximum rotational speed $n_{max}$ can also be referred to as a rotational speed window.

If the rotational speed monitoring circuit 26 determines that the current rotational speed (n) for a period of time Δt lies within the rotational speed range $n_{min} < n < n_{max}$, a first condition is fulfilled. When the first condition is fulfilled, a status indicator I is advantageously set in the rotational speed monitoring circuit 26. A status indicator of this type is also referred to as a "flag" in information technology.

It is expediently monitored via a time element 51 whether the first condition is applied over a time frame ΔT. If this is the case and then the rotational speed drops under a rotational speed limit value $n_G$, the rotational speed monitoring circuit 26 acts on the ignition device 30 in such a manner that the current ignition time ZZP is adjusted toward "early". The effect achieved by this is that the combustion engine 5 does not stop in rich mode even when the throttle lever 28 is let go of. The rotational speed limit value $n_G$ lies below the minimum rotational speed $n_{min}$ of the predefined rotational speed range ($n_{min}$; $n_{max}$).

If, despite the current rotational speed (n) being within the rotational speed range $n_{min}<n<n_{max}$, the rotational speed does not drop below the rotational speed limit value $n_G$ even after expiry of the time $\Delta T$ in the time element 51, a branch is made back via the branch 54 to the junction point 53 and the rotational speed (n) is continued to be monitored. An adjustment of the ignition point ZZP to early does not take place.

If, once the first condition is present, the rotational speed drops below the rotational speed limit value $n_G$ in accordance with the interrogation 55, the ignition point ZZP is adjusted toward early.

For the storage of the state that the first condition has been satisfied, a status indicator I can be set, as reproduced by the field 60. If the status indicator I is set, and the rotational speed n drops below the rotational speed limit value $n_G$, the ignition point ZZP is adjusted toward early.

If a status indicator I is set, the latter is deleted whenever the rotational speed (n) lies above the predefined rotational speed range. The deletion takes place if the rotational speed (n) rises above the maximum rotational speed $n_{max}$ of the rotational speed range. This is interrogated in the field 61, wherein the status indicator I is deleted at the onset of the event.

The status indicator can also be deleted if—as interrogated in the field 55—the current rotational speed (n) drops below the rotational speed limit value $n_G$. This takes place via the branch 62.

It can be provided that the status indicator I which is set is kept for a predefined period of time t. The period of time t and the period of time $\Delta T$ in the field 51 may be a predefined time span of, for example, 2 to 3 seconds. The period of time t and/or the period of time $\Delta T$ is advantageously determined by a predetermined number of consecutive crankshaft revolutions, wherein expediently five to fifty crankshaft revolutions are provided. In particular, ten successive crankshaft revolutions are established in order to determine the period of time, wherein the crankshaft revolutions expediently directly follow one another.

Figure 5:
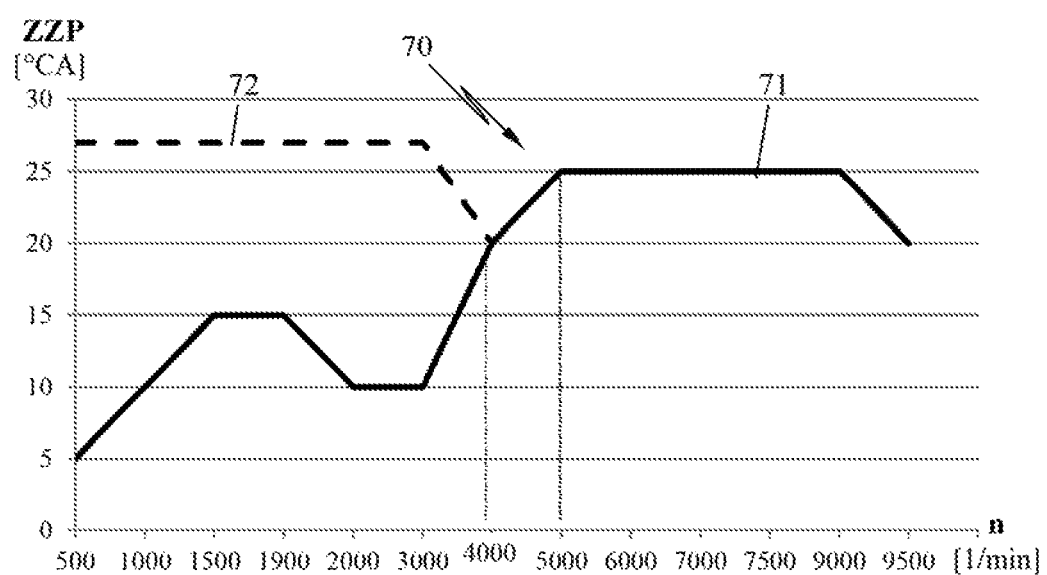
FIG. 5 is an ignition point curve in the form of a bifurcated curve.

FIG. 5 reproduces an ignition point curve 70 over the rotational speed (n), which may also be referred to as a bifurcated curve. The one curve branch 71 in the form of a solid line reproduces the adjustment curve, which is effective for the normal operation of the combustion engine 5, of the ignition point ZZP which is indicated on the Y axis of the diagram. The curve branch 72, shown by dashed lines, reproduces the course of the adjustment curve of the ignition point ZZP when the conditions for switching over the ignition point ZZP toward "early" are satisfied. For this purpose, the rotational speed (n) has to lie within the rotational speed range ($n_{min}$; $n_{max}$) for a predetermined time frame $\Delta T$, that is, has to be greater than the minimum rotational speed $n_{min}$ and lower than the maximum rotational speed $n_{max}$. After this first condition is met, the rotational speed has to drop below a rotational speed limit value $n_G$ that lies below the predefined rotational speed range $n_{min}<n<n_{max}$. If this condition is also satisfied, the rotational speed monitoring circuit 26 acts on the ignition device 30 in such a manner that, instead of the curve branch 71, the curve branch 72 is passed through, that is, the ignition point is adjusted toward "early". The early ignition point ZZP lies within a range of between 20° CA and 27° CA and ensures that the combustion engine 5 does not stop in rich mode. As FIG. 5 also shows, the ZZP of the early adjustment within the rotational speed range of below 3000 r/min is earlier than the ZZP at rotational speeds above 5000 r/min. Whereas an adjustment of the ZZP to up to 25° before the upper dead center takes place on the curve branch 71 during normal operation within a speed range of above 5000 revolutions, the ZZP is set to up to 27° CA before the upper dead center at rotational speeds below 3000 revolutions according to the adjustment toward early according to the invention.

Figure 4:
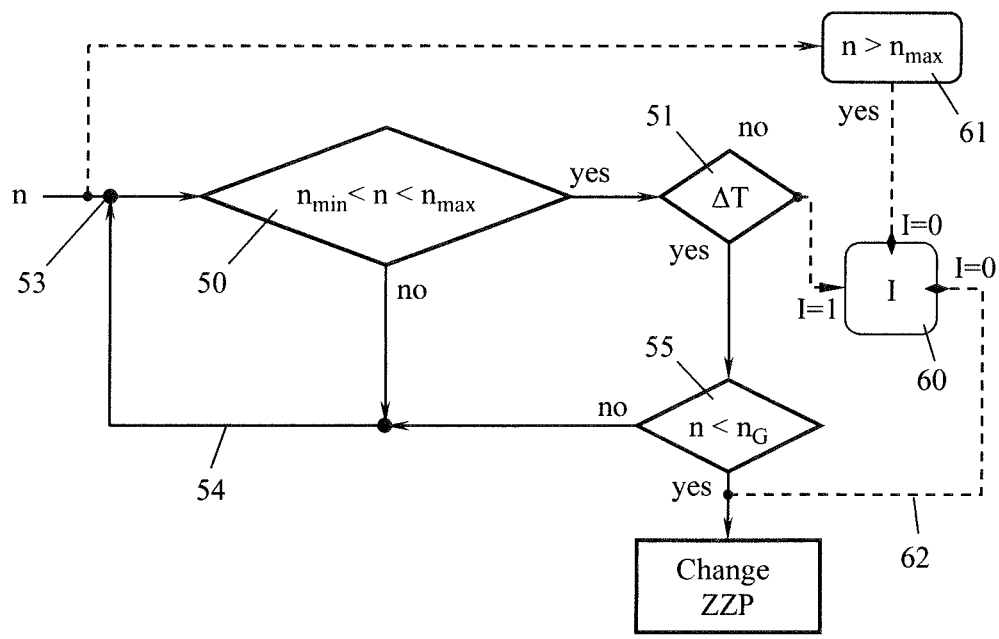
FIG. 4 is a sequence diagram for the operation of the work apparatus.

If the combustion engine 5 is switched off, the rotational speed monitoring circuit 26 and the ignition device 30 also become permanently deenergized. The interrogation states according to FIG. 4 are lost. When the combustion engine 5 is started up again, the system is reset, that is, the system adopts a predefined starting state. The system and the interrogations according to FIG. 4 are restarted from the starting state.

It is understood that the foregoing description is that of the preferred embodiments of the invention and that various changes and modifications may be made thereto without departing from the spirit and scope of the invention as defined in the appended claims.

What is claimed is:

1. A method for operating a work apparatus having a combustion engine including a combustion chamber, a piston delimiting the combustion chamber, a spark plug, an ignition device configured to trigger an ignition spark at the spark plug so as to ignite a fuel/air mixture in the combustion chamber, the ignition device being configured to trigger an ignition spark at the spark plug at an ignition time point (ZZP) in dependence upon the rotational position of the piston, a work tool, a crankshaft configured to drive the work tool, a centrifugal clutch arranged between the crankshaft and the work tool, the method comprising the steps of:
    monitoring the rotational speed (n) of the combustion engine;
    advancing the ignition time point (ZZP) when the following sequentially occurring conditions are satisfied:
        i. a rich fuel/air mixture is supplied to the combustion chamber,
        ii. the rotational speed (n) lies in a predetermined rotational speed range ($n_{min}$; $n_{max}$) within a predetermined time period ($\Delta T$), wherein the predetermined rotational speed range ($n_{min}$; $n_{max}$) is between 3,000 revolutions per minute and 5,000 revolutions per minute, and,
        iii. the rotational speed (n) of the combustion engine drops off to below a rotational speed limit value ($n_G$) after the conditions (i) and (ii) are satisfied,
    so that, after the conditions (i), (ii) and (iii) are fulfilled, a stopping of the combustion engine is prevented as a result of the advancing of the ignition time point (ZZP).

2. The method of claim 1 further comprising the steps of:
    setting a status indicator (I) when said first condition (i) is satisfied; and,
    advancing the ignition time point (ZZP) when there is a drop of the rotational speed to below a rotational speed limit value ($n_G$) with said status indicator being set.

3. A method for operating a work apparatus having a combustion engine including a combustion chamber, a piston delimiting the combustion chamber, a spark plug, an ignition device configured to trigger an ignition spark at the spark plug so as to ignite a fuel/air mixture in the combustion chamber, the ignition device being configured to trigger an ignition spark at the spark plug at an ignition time point (ZZP) in dependence upon the rotational position of the piston, a work tool, a crankshaft configured to drive the work tool, a centrifugal clutch arranged between the crankshaft and the work tool, the method comprising the steps of:

monitoring the rotational speed (n) of the combustion engine;

advancing the ignition time point (ZZP) when the following sequentially occurring conditions are satisfied:
  i. the rotational speed (n) lies in a predetermined rotational speed range ($n_{min}$; $n_{max}$) within a predetermined time period ($\Delta T$), and,
  ii. the rotational speed (n) of the combustion engine drops off to below a rotational speed limit value ($n_G$) after the condition (i) is satisfied, so that, after the conditions (i) and (ii) are fulfilled, a stopping of the combustion engine is prevented as a result of the advancing of the ignition time point (ZZP);

setting a status indicator (I) when said first condition (i) is satisfied;

advancing the ignition time point (ZZP) when there is a drop of the rotational speed to below the rotational speed limit value ($n_G$) with said status indicator being set; and, maintaining the set status indicator (I) until the rotational speed (n) drop below the rotational speed limit value ($n_G$).

4. The method of claim 3 further comprising holding the set status indicator (I) for a predetermined amount of time (t).

5. The method of claim 3, wherein the time period ($\Delta T$) is determined by a predetermined number of sequential crankshaft rotations.

6. The method of claim 5, wherein the time period ($\Delta T$) is determined by five to fifty sequential crankshaft rotations.

7. The method of claim 5, wherein the crankshaft rotations directly follow one another.

8. The method of claim 3, wherein the rotational speed limit value ($n_G$) lies below the predetermined rotational speed range ($n_{min}$; $n_{max}$).

9. The method of claim 3, wherein the centrifugal clutch has an engagement speed lying within the predetermined rotational speed range ($n_{min}$; $n_{max}$).

10. The method of claim 3, wherein the predetermined rotational speed range ($n_{min}$; $n_{max}$) is between 3,000 revolutions per minute and 5,000 revolutions per minute.

11. The method of claim 3 further comprising the step of supplying a rich fuel/air mixture to the combustion chamber of the combustion engine.

12. A method for operating a work apparatus having a combustion engine including a combustion chamber, a piston delimiting the combustion chamber, a spark plug, an ignition device configured to trigger an ignition spark at the spark plug so as to ignite a fuel/air mixture in the combustion chamber, the ignition device being configured to trigger an ignition spark at the spark plug at an ignition time point (ZZP) in dependence upon the rotational position of the piston, a work tool, a crankshaft configured to drive the work tool, a centrifugal clutch arranged between the crankshaft and the work tool, the method comprising the steps of:

monitoring the rotational speed (n) of the combustion engine;

advancing the ignition time point (ZZP) when the following sequentially occurring conditions are satisfied:
  i. the rotational speed (n) lies in a predetermined rotational speed range ($n_{min}$; $n_{max}$) within a predetermined time period ($\Delta T$), and,
  ii. the rotational speed (n) of the combustion engine drops off to below a rotational speed limit value ($n_G$) after the condition (i) is satisfied, so that, after the conditions (i) and (ii) are fulfilled, a stopping of the combustion engine is prevented as a result of the advancing of the ignition time point (ZZP);

setting a status indicator (I) when said first condition (i) is satisfied;

advancing the ignition time point (ZZP) when there is a drop of the rotational speed to below the rotational speed limit value ($n_G$) with said status indicator being set; and, removing the set status indicator (I) when the rotational speed (n) increases above the predetermined rotational speed range ($n_{min}$; $n_{max}$).

13. The method of claim 12 further comprising holding the set status indicator for a predetermined amount of time (t).

14. The method of claim 12, wherein the time period ($\Delta T$) is determined by a predetermined number of sequential crankshaft rotations.

15. The method of claim 14, wherein the time period ($\Delta T$) is determined by five to fifty sequential crankshaft rotations.

16. The method of claim 14, wherein the crankshaft rotations directly follow one another.

17. The method of claim 12, wherein the rotational speed limit value ($n_G$) lies below the predetermined rotational speed range ($n_{min}$; $n_{max}$).

18. The method of claim 12, wherein the centrifugal clutch has an engagement speed lying within the predetermined rotational speed range ($n_{min}$; $n_{max}$).

19. The method of claim 12, wherein the predetermined rotational speed range ($n_{min}$; $n_{max}$) is between 3,000 1/min and 5,000 1/min.

20. The method of claim 12 further comprising the step of supplying a rich fuel/air mixture to the combustion chamber of the combustion engine.

21. A method for operating a work apparatus having a combustion engine including a combustion chamber, a piston delimiting the combustion chamber, a spark plug, an ignition device configured to trigger an ignition spark at the spark plug so as to ignite a fuel/air mixture in the combustion chamber, the ignition device being configured to trigger an ignition spark at the spark plug at an ignition time point (ZZP) in dependence upon the rotational position of the piston, a work tool, a crankshaft configured to drive the work tool, a centrifugal clutch arranged between the crankshaft and the work tool, the method comprising the steps of:

—monitoring the rotational speed (n) of the combustion engine;

advancing the ignition time point (ZZP) when the following sequentially occurring conditions are satisfied:
  i. a rich fuel/air mixture is supplied to the combustion chamber,
  ii. the rotational speed (n) lies in a predetermined rotational speed range ($n_{min}$; $n_{max}$) within a predetermined time period ($\Delta T$), wherein the predetermined rotational speed range ($n_{min}$; $n_{max}$) is between 3,000 revolutions per minute and 5,000 revolutions per minute,
  iii. the rotational speed (n) of the combustion engine drops off to below a rotational speed limit value ($n_G$) after the conditions (i) and (ii) are satisfied, wherein the rotational speed limit value ($n_G$) lies below the predetermined rotational speed range ($n_{min}$; $n_{max}$), so that, after the conditions (i) to (iii) are fulfilled, a stopping of the combustion engine is prevented as a result of the advancing of the ignition time point (ZZP).

* * * * *